(12) United States Patent
Wentinck

(10) Patent No.: US 7,018,435 B1
(45) Date of Patent: Mar. 28, 2006

(54) MIXING DEVICE

(75) Inventor: Hendrik Martinus Wentinck, Amsterdam (NL)

(73) Assignee: Shell Oil Company, Houston, TX (US)

( * ) Notice: Subject to any disclaimer, the term of this patent is extended or adjusted under 35 U.S.C. 154(b) by 756 days.

(21) Appl. No.: 10/070,627

(22) PCT Filed: Sep. 5, 2000

(86) PCT No.: PCT/EP00/08727

§ 371 (c)(1),
(2), (4) Date: Mar. 4, 2002

(87) PCT Pub. No.: WO01/18451

PCT Pub. Date: Mar. 15, 2001

(30) Foreign Application Priority Data

Sep. 6, 1999 (EP) .................................. 99307065

(51) Int. Cl.
*C01B 1/32* (2006.01)

(52) U.S. Cl. ..................... 48/198.8; 422/211; 422/220; 422/224; 48/127.9; 366/165.1; 261/114.5

(58) Field of Classification Search ................ 422/220, 422/194, 211, 224, 190; 48/127.9, 197 R, 48/198.8; 366/165.1; 429/20; 261/114.5

See application file for complete search history.

(56) References Cited

U.S. PATENT DOCUMENTS

| | | | | |
|---|---|---|---|---|
| 4,390,346 | A | 6/1983 | Cramer et al. | |
| 4,816,137 | A * | 3/1989 | Swint et al. | 208/154 |
| 5,939,025 | A * | 8/1999 | Ahmed et al. | 422/111 |
| 6,180,068 | B1 * | 1/2001 | Boyd et al. | 422/195 |
| 6,183,702 | B1 * | 2/2001 | Nguyen et al. | 422/194 |
| 6,244,367 | B1 * | 6/2001 | Ahmed et al. | 180/65.1 |
| 6,620,389 | B1 * | 9/2003 | Lesieur | 422/220 |
| 6,863,967 | B1 * | 3/2005 | Vanden Bussche et al. | 422/129 |
| 2002/0192154 | A1 * | 12/2002 | Kramer et al. | 423/651 |

FOREIGN PATENT DOCUMENTS

| | | |
|---|---|---|
| EP | 0 896 192 A | 2/1999 |
| FR | 2 728 892 A | 7/1996 |
| WO | 98 30322 A | 7/1998 |
| WO | 98 49096 A | 11/1998 |

* cited by examiner

*Primary Examiner*—N. Bhat

(57) ABSTRACT

Described is a mixing device for mixing a gaseous stream of a fuel and an oxidant that has a cylindrical mixing chamber, means for injecting a gaseous stream of the fuel tangentially along the inner surface of the wall of the mixing chamber, and means for injecting a stream of the oxidant axially along the central longitudinal axis of the mixing chamber, wherein the diameter of the mixing chamber and the dimensions and location of the means for injecting the fuel and the oxidant are such that the tangentially injected stream of the fuel forms a wall jet around the axially injected stream of the oxidant without impinging upon the other stream. A reactor for the partial oxidation of a hydrocarbonaceous fuel containing the mixing device and to a process for the catalytic partial oxidation of a hydrocarbonaceous fuel using the mixing device is further described.

26 Claims, 2 Drawing Sheets

MIXING DEVICE

The present invention concerns catalytic partial oxidation of a fuel. In particular the present invention relates to a mixing device suitable for mixing a gaseous stream comprising a fuel and a gaseous oxidant, to a reactor for the partial oxidation of the fuel comprising such a mixing device, and to a catalytic partial oxidation process using such a mixing device.

Partial oxidation of a fuel, in particular hydrocarbons, in the presence of a catalyst is an attractive route for the preparation of mixtures of carbon monoxide and hydrogen, normally referred to as synthesis gas. The partial oxidation of paraffinic hydrocarbons is an exothermic reaction represented by the equation:

$$C_nH_{2n+2} + n/2\ O_2 \rightarrow n\ CO + (n+1)H_2$$

There is literature in abundance on the catalysts and the process conditions for the catalytic partial oxidation of gaseous hydrocarbons, in particular methane. Reference is made, for instance, to EP-A-303 438, U.S. Pat. No. 5,149,464, and International patent application WO 92/11199.

Since the catalytic partial oxidation reaction proceeds at very short contact times (in the order of tens of milliseconds), it is necessary that the reactants are well-mixed when brought into contact with the catalyst. Otherwise, the reaction will proceed at an undesirable stoichiometry and the desired product selectivity will not be obtained.

The mixture of the reactants of the catalytic partial oxidation process, i.e. a hydrocarbonaceous fuel and an oxygen-containing gas, is highly reactive and explosive, especially at the mixing conditions which are applied, i.e. at elevated temperature and pressure and in amounts giving an oxygen-to-carbon ratio in the range of from 0.3 to 0.8.

In general, the risk of explosions and uncontrolled gas-phase reactions is higher when the mixture contains more oxygen. In order to minimise the occurrence of stagnant or quasi-stagnant oxygen-rich zones in the mixer, it is important that the fuel and the oxygen-containing gas are rapidly mixed, i.e. that a high degree of mixedness is achieved within a short time after the reactants are initially contacted with each other. Reference to oxygen-rich zones is to zones wherein the oxygen concentration is higher than in the completely-mixed mixture.

The degree of mixedness can, for example, be quantified by the relative deviation in the ratio of the mole fractions of the hydrocarbonaceous fuel and the oxygen-containing gas. This relative deviation is abbreviated as $\gamma$ and defined as follows:

$$\gamma = \frac{(X_{HC}/X_{O2})_{max} - (X_{HC}/X_{O2})_{min}}{2 \cdot (X_{HC}/X_{O2})_{av}}$$

wherein $X_{HC}$ and $X_{O2}$ are the mole fractions of the hydrocarbonaceous fuel and of the oxygen-containing gas, respectively, in the mixture. The subscripts 'min', 'max', and 'av' designate the minimum, maximum, and average ratios found in the mixture. A low value for $\gamma$ corresponds with a high degree of mixedness and vice versa. A value for $\gamma$ of 0 means a completely-mixed mixture. The degree of mixedness at a certain distance from the point where the reactants are initially contacted can be quantified by measuring the time-averaged values for $X_{HC}/X_{O2}$ at different locations within the plane perpendicular to the flow direction of the mixture at that certain distance.

Mixers should be such that a low time-averaged value for $\gamma$ is achieved at a short distance from the initial point of contact or within a short time after initial contact between the reactants. Preferably, a value for $\gamma$ below 0.1, more preferably below 0.05, is achieved within a residence time of 15 milliseconds.

It is not only important that the time-averaged values for $\gamma$ are low, but also that the flow has a high stability, i.e. that the fluctuations in the ratio $X_{HC}/X_{O2}$ at a single location and at short time scales are small. Reference to short time scales is to time scales in the order of the thermal response time of the upstream surface of the catalyst bed, typically in the order of tens of milliseconds. The flow stability can be quantified by the measure $\delta$, which is the quotient of the root mean square and the average of the values of the ratio $X_{HC}/X_{O2}$ measured several times at a single location, each measurement with a short sampling time. Thus $\delta$ is defined as:

$$\delta = \frac{\sqrt{\frac{\sum_{i=1}^{n}((X_{HC}/X_{O2})_i - (X_{HC}/X_{O2})_{av})^2}{(n-1)}}}{(X_{HC}/X_{O2})_{av}}$$

wherein n is the number of measurements of $X_{HC}/X_{O2}$ at a single location, each measurement carried out with a short sampling time. Ideally, the value for $\delta$ is of the same order of magnitude or smaller than the time-averaged value for $\gamma$.

Further, in order to avoid uncontrolled gas-phase reactions, in particular ignition, the residence time of a feed mixture in a mixer should be below the auto ignition delay time of that mixture.

Mixing devices suitable for mixing a hydro-carbonaceous fuel and an oxygen-containing gas are known, for example in the art of acetylene production or in the art of catalytic partial oxidation of hydrocarbons.

EP-A-303 439 discloses a gas mixer and distributor for feeding a mixture of a hydrocarbon feedstock and an oxygen-rich gas to a catalytic reactor section. In the gas mixer, one of the gases is radially injected by means of inlet holes into a tube wherein the other gas is flowing. Thus, the radially injected gas impinges upon the other gas.

WO 98/49095 discloses an injector/reactor apparatus for the partial oxidation of light hydrocarbon gases, comprising a manifold of mixing nozzles upstream of a catalytic partial oxidation zone. The disclosed mixing nozzles are mixing cups into which one gas stream is injected from an axial orifice as an axial stream and the other gas is injected from one or more radial orifices as one or more somewhat radial streams which impinge upon the axial stream.

A disadvantage of impinging jets is that they can lead to flow instabilities, i.e. fluctuations in the gas composition at short time scales and thus a high value for $\delta$. Flow instabilities lead to local temperature fluctuations at the upstream surface of the catalyst and, therefore, deteriorate the lifetime of the catalyst.

Thus, there is a need in the art for mixing devices wherein a hydrocarbonaceous fuel and an oxygen-containing gas can be mixed at a high mixing rate, but also with a high flow stability.

Surprisingly it has been found that a very high mixing rate, at a high flow stability can be achieved by using a novel mixing device wherein a gaseous stream containing the hydrocarbonaceous fuel is tangentially injected perpendicular to an axially-injected, oxygen-containing stream, without the occurrence of impingement. Accordingly, the mixing device of the present invention comprises a cylindrical mixing chamber, means for injecting a gaseous stream comprising a fuel tangentially along the inner surface of the wall of the mixing chamber, and means for injecting a gaseous stream of oxidant axially along the central longitudinal axis of the mixing chamber, wherein the diameter of the mixing chamber and the dimensions and location of the means for injecting the fuel and the oxidant are such that, during normal operation, the tangentially injected stream comprising the fuel forms a wall jet around the axially injected stream of the oxidant without impinging upon the axially injected stream.

The mixing device of the present invention is particularly suitable for mixing a hydrocarbonaceous fuel and an oxygen-containing gas, prior to the partial oxidation of the hydrocarbonaceous fuel. Accordingly, the present invention further relates to a reactor comprising a mixing device as hereinbefore defined and a partial oxidation zone.

The partial oxidation zone may be any partial oxidation zone known in the art, such as a non-catalytic partial oxidation zone, an autothermal reforming zone or a catalytic partial oxidation zone, preferably a catalytic partial oxidation zone.

The mixing device and the reactor of the invention will now be illustrated in a non-limiting manner with reference to the schematic FIGS. 1 to 4.

Figure 1:
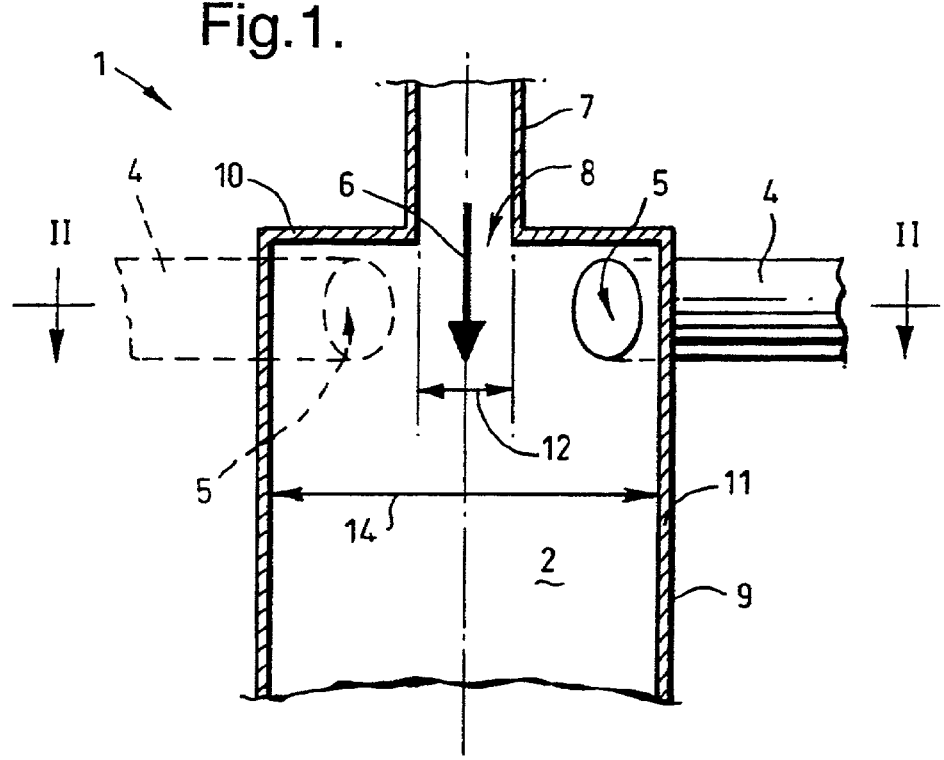
FIG. 1 is a longitudinal section of the mixing device according to the invention.
Figure 2:
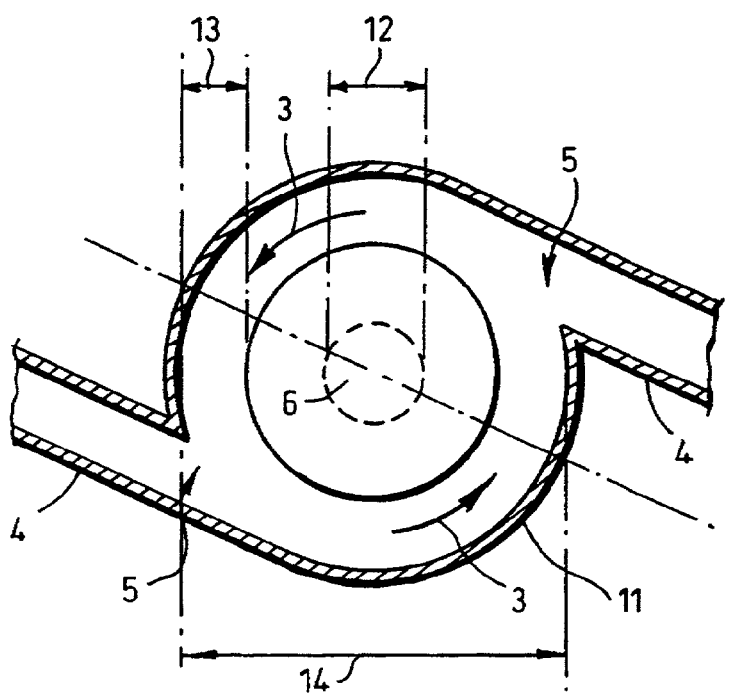
FIG. 2 is a cross-section along the line II—II of FIG. 1.

Reference is now made to FIGS. 1 and 2. The mixing device 1 comprising a cylindrical mixing chamber 2, means for tangentially injecting a gaseous, fuel-comprising stream 3 comprising two inlet tubes 4, each having an outlet opening 5, and means for axially injecting a gaseous stream 6 of oxidant comprising an inlet tube 7 having an outlet opening 8. The mixing chamber 2 is defined by a housing 9, comprising a top cover 10, and a cylindrical side wall 11. At its downstream end, the mixing chamber 2 is in fluid communication with a reaction zone (not shown), such as a catalytic partial oxidation zone. Optionally, a diffuser (not shown) is placed between the mixing chamber 2 and the reaction zone (not shown). The cylindrical mixing chamber 2 can have an oval or a round shape, preferably a round shape.

During normal operation, a stream 6 of a gaseous oxidant is axially injected into the mixing chamber 2 and a gaseous stream 3 comprising the fuel is tangentially injected along the inner surface of the cylindrical side wall 11 of the mixing chamber 2, such that a wall jet of the fuel-comprising stream 3 is created around the axial stream 6 of the oxidant. The occurrence of a wall jet of the fuel-comprising stream 3 avoids the presence of quasi-stagnant oxygen-rich zones along the cylindrical side wall 11.

The axially injected stream 6 has a diameter 12 and the tangentially injected stream 3 has a width 13. The mixing chamber 2 has an inner diameter 14. Reference herein to the diameter 12 of the stream 6 of oxidant is to the diameter at the outlet opening 8 of the means for injecting the stream 6. Reference to the width 13 of the fuel-comprising stream 3 is to the width in the perpendicular plane wherein the fuel-comprising stream 3 is injected. A perpendicular plane refers to a plane perpendicular to the longitudinal axis of the cylindrical mixing chamber 2.

Figure 3:
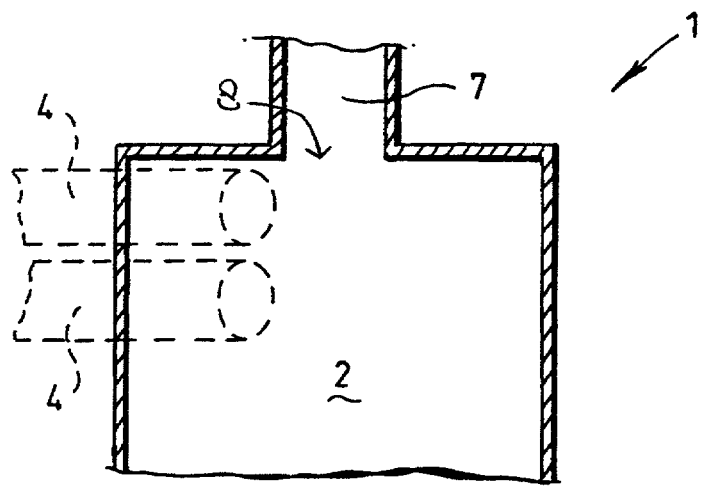
FIG. 3 is a longitudinal section of the mixing device according to another embodiment of the invention.

FIG. 3 shows a preferred embodiment of the mixing device 1 of the present invention wherein the means for injecting a stream of fuel-comprising gas comprise two axially placed apart inlet tubes 4.

Figure 4:
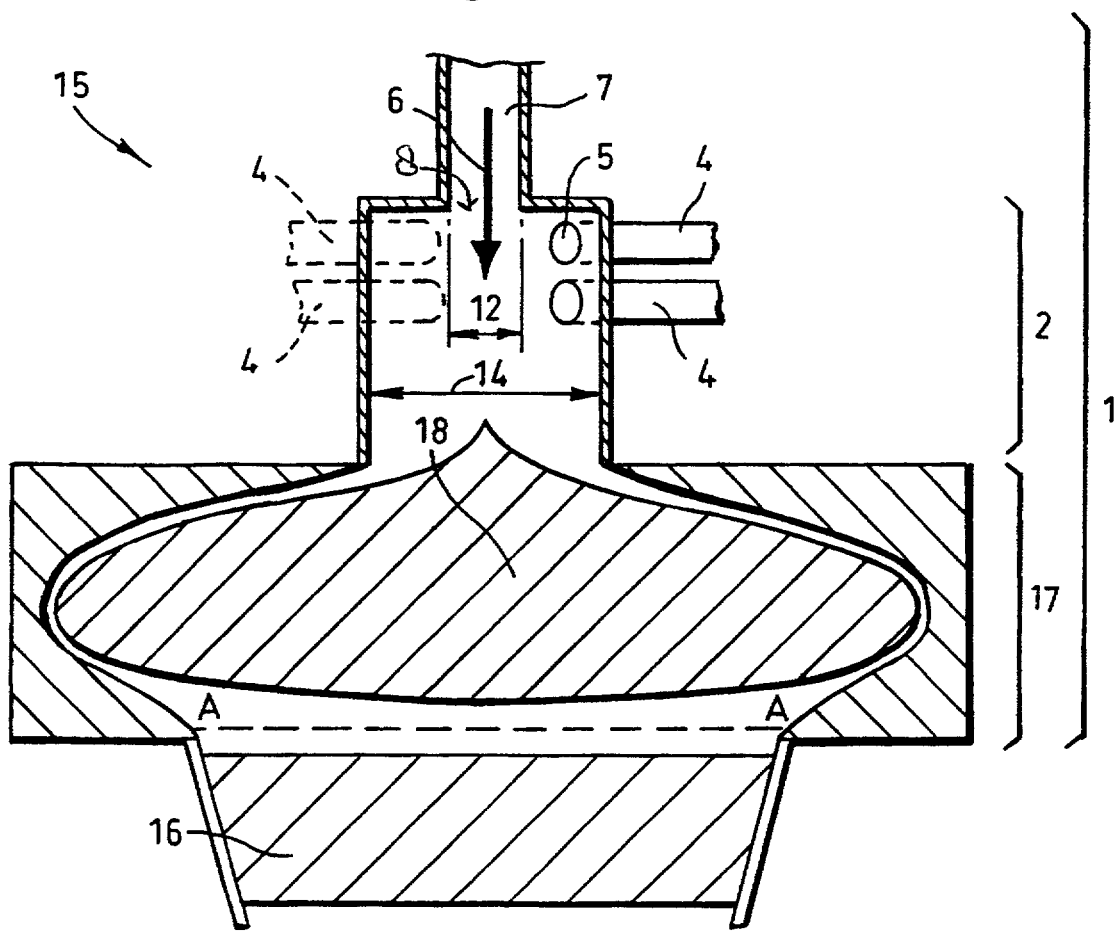
FIG. 4 is a longitudinal section of an embodiment of the reactor according to the invention.

FIG. 4 shows a reactor 15 according to an embodiment of the present invention. The reactor 15 comprises a mixing device 1 and a catalyst bed 16 in the form of a piece of ceramic foam. The mixing device 1 comprises a mixing chamber 2, means for tangentially injecting a stream 3 of fuel-comprising gas comprising two sets of two axially spaced apart inlet tubes 4, means for injecting an oxidant comprising a single inlet tube 7, and a diffuser 17 with an insert 18. The inlet tubes 4 of the means for injecting the fuel each have an inner diameter of 5 mm, the inlet tube 7 of the means for injecting the oxidant has an inner diameter of 8 mm. The height and the inner diameter 14 of the mixing chamber 2 are 26.5 and 24 mm, respectively.

It is a requirement of the mixing device of the present invention that the inner diameter 14 of the mixing chamber 2 and the dimensions and location of the means 4, 5, 7, 8 for injecting the fuel and the oxidant are such that, during normal operation, the tangentially injected stream 3 comprising the fuel forms a wall jet around the axially injected stream 6 of the oxidant without impinging upon the axially injected stream 6.

Impingement is avoided if, during normal operation:

$$d_{ox} < d_{mix} - 2 \cdot d_{fuel}$$

wherein $d_{ox}$ is the diameter 12 of the injected stream 6 of the oxidant at the outlet opening 8 of the means for injecting, i.e. at the point where the stream 6 is injected into the mixing chamber 2;

$d_{mix}$ is the inner diameter 14 of the mixing chamber 2; and $d_{fuel}$ is the width 13 of the injected fuel-comprising stream 3 in the perpendicular plane wherein it is injected.

Preferably, $d_{ox} < d_{mix} - 3 \cdot d_{fuel}$.

It will be appreciated that $d_{ox}$ is typically equal to the inner diameter of the outlet hole 8 of the injecting means. In the case of an oval mixing chamber 2 and/or an ovally-shaped injected stream 6 of oxidant, the above inequality has to be fulfilled along each diameter of the mixing chamber 2.

Preferably, the width 13 of the fuel-comprising stream ($d_{fuel}$) is not greater than a third of the inner diameter 14 of the mixing chamber 2 ($d_{mix}$), more preferably, $d_{fuel}$ is not greater than 0.25 $d_{mix}$. The inner diameter 14 of the mixing chamber 2 is preferably at most 100 mm, more preferably at most 50 mm, even more preferably at most 30 mm.

The means for injecting the fuel-comprising stream 3 may be any means suitable for forming a wall jet of the fuel-comprising gas. Examples of suitable means for injecting are inlet openings or inlet tubes. The fuel-comprising gas may be tangentially injected through one single opening. Preferably, the means for injecting the fuel-comprising gas comprise at least two openings arranged in a perpendicular plane at regular intervals along the circumference of the cylindrical mixing chamber 2, for example two opposite, diametrical openings as shown in FIG. 1.

The means for injecting the stream 6 of oxidant may be any means suitable for forming a gas jet along the central longitudinal axis of the mixing chamber 2. Preferably, the oxidant is injected into the mixing chamber 2 through a single opening. Examples of a suitable means for injecting are a nozzle, an inlet opening or the outlet opening of an inlet tube.

The opening(s) through which the stream 6 of the oxidant is injected into the mixing chamber 2 is (are) located at the same level or near the level of the top cover 10, preferably at the level of the top cover 10. The stream 3 of the fuel-comprising gas is preferably injected into the mixing chamber 2 at the same level or just downstream of the level at which the stream 6 of oxidant is injected.

It has been found that the mixing rate can be further improved by injecting a stream 3 of the fuel-comprising gas having a width $d_{fuel}$ and a major axis in the direction of the longitudinal axis of the mixing chamber 2 which is greater than its width $d_{fuel}$. Thus, a wall jet is formed over a greater length of the cylindrical side wall 11 of the mixing chamber 2. This can be achieved by means of an opening having an oval shape, for example a slit, with the major axis parallel to the longitudinal axis of the mixing chamber 2 or by means of two or more axially placed apart openings, such as shown in FIGS. 3 and 4.

The mixing device of the present invention is particularly suitable for operating at higher Re numbers, i.e. typically above $10^4$. Reference herein to Re numbers is to Re numbers based on the viscosity and density of the mixed gases, on the superficial velocity of the mixed gases at the exit of the mixing chamber 2 and on the diameter 14 of the mixing chamber 2.

In order to achieve efficient mixing, the momenta of the gases to be mixed should be of the same order of magnitude. Preferably, the ratio of the momentum of the fuel-comprising gas to the momentum of the gaseous oxidant is in the range of from 0.3 to 3. Preferably, the density of the oxidant is higher that that of the fuel-comprising gas.

The present invention further relates to a process for the catalytic partial oxidation of a fuel, which process comprises mixing a gaseous stream comprising the fuel and a gaseous oxidant to obtain a feed mixture, and contacting the feed mixture with a catalyst, wherein the gaseous stream comprising the fuel and the gaseous oxidant are mixed in the mixing device as hereinbefore defined.

Catalysts suitable for the use in the partial oxidation of a hydrocarbonaceous fuel are known in the art. Such catalysts generally comprises, as the catalytically active material, a metal selected from Group VIII of the Periodic Table of the Elements. References in this specification to the Periodic Table of the Elements are to the CAS version, as published in the CRC Handbook of Chemistry and Physics, 68th Edition. Catalysts comprising, as the catalytically active material, a metal selected from rhodium, iridium, palladium and platinum are preferred. Catalysts comprising rhodium or iridium are most preferred.

Typically, the catalytically active material is supported on a catalyst carrier material. Suitable carrier materials are well known in the art and include refractory oxides, such as silica, alumina, titania, zirconia and mixtures thereof, and metals. High-alloy, alumina-containing steel, such as fecralloy-type materials are particularly suitable metals. The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight. In addition to the catalytically active material, the catalyst may comprise a promoter or performance-enhancing compound. Suitable promoters are known in the art.

Preferably, the fuel-comprising gas is a gaseous hydrocarbonaceous fuel. Alternatively, the fuel-comprising gas is an inert carrier gas comprising droplets of a liquid hydrocarbonaceous fuel, for example naphtha, kerosene or synthetic gas oil.

The hydrocarbonaceous fuel is in the gaseous phase when brought into contact with the catalyst during operation. The fuel may contain compounds that are liquid and/or compounds that are gaseous under standard conditions of temperature and pressure (i.e. at 0° C. and 1 atm.).

Preferably, the hydrocarbonaceous fuel comprises methane, natural gas, associated gas or other sources of light hydrocarbons. In this respect, the term "light hydrocarbons" is a reference to hydrocarbons having from 1 to 5 carbon atoms.

The hydrocarbonaceous fuel may comprise oxygenates (being gaseous and/or being liquid under standard condition of temperature and pressure). Oxygenates to be used as (part of) the fuel in the process according to the present invention are defined as molecules containing apart from carbon and hydrogen atoms at least 1 oxygen atom which is linked to either one or two carbon atoms or to a carbon atom and a hydrogen atom. Examples of suitable oxygenates comprise methanol, ethanol, dimethyl ether and the like.

The gaseous oxidant can be air, oxygen-enriched air or pure oxygen, preferably pure oxygen.

In the process of the present invention, the feed mixture may optionally comprise steam. Optionally, the feed mixture may comprise carbon dioxide in a concentration of up to 60% by volume of the total feed mixture. The steam and or the carbon dioxide may be added with either the fuel-comprising gas or the oxidant, preferably with the fuel-comprising gas.

In the process of the present invention, the feed mixture comprises the hydrocarbonaceous fuel and the oxidant preferably in amounts giving an oxygen-to-carbon ratio of from 0.3 to 0.8, more preferably of from 0.45 to 0.75. References herein to the oxygen-to-carbon ratio refer to the ratio of oxygen in the form of molecules ($O_2$) to carbon atoms present in the hydrocarbonaceous fuel. Oxygen-to-carbon ratios in the region of the stoichiometric ratio of 0.5, i.e. ratios in the range of from 0.45 to 0.65, are especially preferred. If steam is present in the feed mixture, the steam-to-carbon ratio is preferably in the range of from above 0.0 to 3.0, more preferably from 0.0 to 2.0.

The feed mixture is preferably contacted with the catalyst under adiabatic conditions. For the purposes of this specification, the term "adiabatic" is a reference to reaction conditions under which substantially all heat loss and radiation from the reaction zone are prevented, with the exception of hot gas leaving the catalyst. A substantial prevention of all heat losses, means that heat losses are at most 5% of the net calorific value of the feed mixture, preferably at most 1% of the net calorific value.

For applications on a commercial scale, elevated pressures, that is pressures significantly above atmospheric pressure are most suitably applied in the process of the present invention. The process is preferably operated at pressures in the range of from 2 to 150 bar (absolute). More preferably, the process is operated at pressures in the range of from 2 to 100 bar (absolute), especially from 5 to 50 bar (absolute).

Under the preferred conditions of high pressure prevailing in processes operated on a commercial scale, the feed mixture is preferably contacted with the catalyst bed at a temperature in the range of from 750 to 1400° C., more preferably of from 850 to 1350° C., even more preferably of from 900 to 1300° C. Reference herein to temperature is to the temperature of the gas leaving the catalyst.

The feed mixture may be provided during the operation of the process at any suitable space velocity. It is an advantage of the process of the present invention that very high gas space velocities can be achieved. Thus, gas space velocities for the process (expressed in normal liters of gas per kilogram of catalyst per hour, wherein normal liters refers to liters under STP conditions, i.e. 0° C. and 1 atm.) are in the range of from 20,000 to 100,000,000 Nl/kg/h, more preferably in the range of from 50,000 to 50,000,000 Nl/kg/h. Space velocities in the range of from 500,000 to 30,000,000 Nl/kg/h are particularly suitable for use in the process.

EXAMPLE

In the reactor (15) as shown in FIG. 4, a stream (6) of 4.4 grams per second of oxygen (density is 1.7) having a temperature of 22° C. is axially injected through the outlet opening (8) of inlet tube (7) and a stream of 4.7 grams per second of natural gas (density is 0.6) having a temperature of 235° C. is tangentially injected through the outlet openings (5) of inlet tubes (4) at atmospheric pressure. The resulting Re number is about 30,000.

The composition of the mixture of natural gas and oxygen is measured at several locations in the cross-sectional plane along line A—A, i.e. downstream of the insert (18). The residence time of the reactants in the mixing chamber (2) is 1 milliseconds, in the diffuser (17) 10 milliseconds. The value for γ, i.e. the time-averaged value for the relative deviation in $X_{HC}/X_{O2}$ in the cross-sectional plane along line A—A, is 0.03 and the value for δ, i.e. the quotient of the root mean square value and the average value of the $X_{HC}/X_{O2}$ values measured at a single location in the plane along line A—A and at short time scales, is 0.03.

It will be appreciated that higher pressures, i.e. typically 40–50 bar, will be applied on a commercial scale.

The invention claimed is:

1. A mixing device for mixing a first gaseous stream comprising a fuel and a second gaseous stream comprising an oxidant, which mixing device comprises: a cylindrical mixing chamber having a wall and a central longitudinal axis, a first injector for injecting the first stream tangentially along an inner surface of the wall, and a second injector for injecting the second stream axially along the central longitudinal axis, wherein the diameter of the mixing chamber, and dimensions and locations of the first injector and the second injector are such that, during normal operation, the injected first stream forms a wall jet around the injected second stream without impinging upon the injected second stream.

2. The mixing device according to claim 1, wherein, during normal operation, $$d_{ox} < d_{mix} - 3 \cdot d_{fuel}$$

wherein:
  $d_{ox}$ is the diameter of the second stream at the point where the stream is injected;
  $d_{mix}$ is the diameter of the mixing chamber; and
  $d_{fuel}$ is the width of the first stream in a perpendicular plane in which it is injected.

3. The mixing device according to claim 1, wherein the first injector comprises at least two openings arranged in a perpendicular plane at regular intervals along the circumference of the cylindrical mixing chamber.

4. The mixing device according to claim 1, wherein the first injector comprises two axially placed apart openings.

5. The mixing device according to claim 2, wherein $d_{fuel}$ is not greater than 0.33 $d_{mix}$.

6. The mixing device according to claim 2, wherein $d_{mix}$ is at most 100 mm.

7. A reactor for the partial oxidation of a fuel comprising a mixing device and a partial oxidation reaction zone, wherein the mixing device comprises a cylindrical mixing chamber having a wall and a central longitudinal axis, a first injector for injecting a first gaseous stream comprising fuel tangentially along an inner surface of the wall, and a second injector for axially injecting a second stream comprising oxidant along the central longitudinal axis, wherein the diameter, and dimensions and locations of the injectors are such that, during normal operation, the injected first stream forms a wall jet around the injected second stream without impinging upon the injected second stream.

8. The reactor according to claim 7, wherein the partial oxidation reaction zone comprises a catalyst.

9. A process for the catalytic partial oxidation of a fuel, which process comprises mixing a first gaseous stream comprising the fuel and a second gaseous stream comprising oxidant to obtain a feed mixture, and contacting the feed mixture with a catalyst, wherein the first stream and the second stream are mixed in a mixing device comprising a cylindrical mixing chamber having a wall and a central longitudinal axis, a first injector for injecting the first stream tangentially along an inner surface of the wall, and a second injector for injecting the second stream axially along the central longitudinal axis, wherein the diameter of the mixing chamber, and the dimensions and location of the first injector and the second injector are such that, during normal operation, the injected first stream forms a wall jet around the injected second stream without impinging upon the injected second stream.

10. The process according to claim 9 wherein the first gaseous stream is a gaseous hydrocarbonaceous fuel.

11. The process according to claim 9, wherein the second gaseous stream is pure oxygen.

12. The process according to claim 9, wherein the feed mixture comprises the fuel and the oxidant in amounts giving an oxygen-to-carbon ratio of from between 0.3 to 0.8.

13. The process according to claim 9, wherein the feed mixture is contacted with the catalyst at a pressure in the range of from between 2 to between 150 bar.

14. The process according to claim 9, wherein the feed mixture is contacted with the catalyst at a gas hourly space velocity of from between 20,000 to between 100,000,000 Nl/kg/h.

15. The process according to claim 9, wherein the feed mixture is contacted with the catalyst at a temperature of from between 750 to between 1400° C.

16. The mixing device according to claim 5, wherein $d_{fuel}$ is not greater than 0.25 $d_{mix}$.

17. The mixing device according to claim 6, wherein $d_{mix}$ is at most 50 mm.

18. The mixing device according to claim 6, wherein $d_{mix}$ is at most 30 mm.

19. The process according to claim 10, wherein the first gaseous stream comprises natural gas.

20. The process according to claim 10, wherein the first gaseous stream is methane.

21. The process according to claim 12, wherein the feed mixture comprises the fuel and the oxidant in amounts giving an oxygen-to-carbon ratio of from between 0.45 to 0.75.

22. The process according to claim 13, wherein the feed mixture is contacted with the catalyst at a pressure in the range of from between 5 to 50 bar (absolute).

23. The process according to claim 14, wherein the feed mixture is contacted with the catalyst at a gas hourly space velocity of from between 50,000 to 50,000,000 Nl/kg/h.

24. The process according to claim 14, wherein the feed mixture is contacted with the catalyst at a gas hourly space velocity of from between 500,000 to 30,000,000 Nl/kg/h.

25. The process according to claim 15, wherein the feed mixture is contacted with the catalyst at a temperature of from between 850 to 1350° C.

26. The process according to claim 15, wherein the feed mixture is contacted with the catalyst at a temperature of from between 900 to 1300° C.

* * * * *